(12) United States Patent
Park et al.

(10) Patent No.: US 6,396,869 B1
(45) Date of Patent: May 28, 2002

(54) MODULATION APPARATUS AND METHOD USING ZERO-CROSSING DETECTION

(75) Inventors: Jong-Hyeon Park, Seoul; Je-Woo Kim, Songnam, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/261,748

(22) Filed: Mar. 3, 1999

(30) Foreign Application Priority Data

Mar. 3, 1998  (KR) ............................................. 98-7667

(51) Int. Cl.[7] .......................... H04B 15/00; H04K 1/00; H04L 27/30
(52) U.S. Cl. ........................................ 375/146; 375/308
(58) Field of Search ................................. 375/140, 141, 375/146, 279, 308, 303; 332/103

(56) References Cited

U.S. PATENT DOCUMENTS

| | | | | |
|---|---|---|---|---|
| 4,338,579 A | * | 7/1982 | Rhodes ........................ | 332/100 |
| 5,521,559 A | * | 5/1996 | Ichihara ....................... | 332/117 |
| 5,960,040 A | * | 9/1999 | Cai et al. ..................... | 375/279 |
| 6,094,450 A | * | 7/2000 | Shockey ....................... | 375/141 |
| 6,198,763 B1 | * | 3/2001 | Inoue et al. ................. | 375/130 |

\* cited by examiner

*Primary Examiner*—Chi Pham
*Assistant Examiner*—Phuong Phu
(74) *Attorney, Agent, or Firm*—Robert E. Bushnell, Esq.

(57) ABSTRACT

A spread spectrum apparatus for a code division multiple access communication system maintains orthogonality between transmission signals. In the spread spectrum apparatus, a spreader combines first and second input signals with corresponding pseudo noise sequences to generate first and second spread signals. A zero-crossing detector determines whether zero-crossing occurs between the first spread signal and the second spread signal to generate a zero-crossing detection signal. A first delay staggers the first spread signal in a first direction and a second delay staggers the second spread signal in a second direction. A first selector selects one of the first spread signal and a first staggered signal and a second selector selects one of the second spread signal and a second staggered signal in response to the zero-crossing detection signal. Accordingly, first and second staggered signals are selected when zero-crossing occurs, and first and second spread signals are selected when zero-crossing does not occur, thereby maintaining orthogonality of transmission signals.

41 Claims, 7 Drawing Sheets

MODULATION APPARATUS AND METHOD USING ZERO-CROSSING DETECTION

This application makes reference to, incorporates the same herein, and claims all benefits accruing under 35 U.S.C. §119 from an application entitled Modulation Apparatus And Method Using Zero-Crossing Detection earlier filed in the Korean Industrial Property Office on the 3$^{rd}$ day of March 1998, and there duly assigned Ser. No.7667/1998.

BACKGROUND OF THE INVENTION

1. Field of the Invention

The present invention relates to a spread spectrum process and apparatus for code division multiple access communication, and, more particularly, to processes and apparatus for maintaining orthogonality between channel signals using zero-crossing detection.

2. Description of the Related Art

Code division multiple access communication systems are generally discussed in such exemplars of the art as, for example, the *System And Method For Generating Signal Waveforms In A CDMA Cellular Telephone System*, U.S. Pat. No. 5,103,459 issued to Klein S. Gilhousen, et al. Other background may be found in *Spread Spectrum Communications* by Marvin K. Simon, et al., published by Computer Science Press, 1989; *Spread Spectrum Communications Handbook*, by Marvin K. Simon, et al., published by McGraw-Hill in 1994; and *Spread Spectrum System With Commercial Applications*, by Robert C. Dixon, published by John Wiley & Sons in 1994. Other efforts include the *Data Recovery Technique for Asynchronous CDMA Systems*, U.S. Pat. No. 5,431,395 issued to Bi; *All Digital Maximum Likelihood Based Spread Spectrum Receiver*, U.S. Pat. No. 5,361,276 issued to Subramanian; *Spread Spectrum Communication System And An Apparatus For Communication Utilizing This System*, U.S. Pat. No. 5,400,359, issued to Hikoso, et al.; and *Method And Apparatus For Bifurcating Signal Transmission Over In-Phase And Quadrature Phase Spread Spectrum Communication Channels*, U.S. Pat. No. 5,414,728, issued to Zehavi. More recent effort include the *System And Method For Generating Signal Waveforms In a CDMA Cellular Telephone System*, U.S. Pat. No. 5,416,797 issued to Gilhousen, et al.; *Methods Of And Devices for Enhancing Communications That Use Spread Spectrum Technology By Using Variable Code Techniques*, U.S. Pat. No. 5,546,420 issued to Seshadri et al.; the *Direct Sequence Code Division Multiple Access (DS-CDMA) Communication System And A Receiver For Use In Such A System*, U.S. Pat. No. 5,550,810 issued to Monogioudis, et al.; *Synchronous CDMA Transmitter/Receiver*, U.S. Pat. No. 5,583,835 issued to Giallorenzi, et al.; *Standalone Canceller Of Narrow Band Interference For Spread Spectrum Receiver*, U.S. Pat. No. 5,596,600 issued to Dimos, et al.; the *DS/CDMA Receiver For High-Speed Fading Environment*, U.S. Pat. No. 5,646,964 issued to Ushirokawa, et al.; *CDMA Demodulator And Demodulation Method*, U.S. Pat. No. 5,694,388 issued to Sawahashi, et al.; and *CDMA Communication System In Which Interference Removing Capability Is Improved*, U.S. Pat. No. 5,734,647 issued to Yoshida, et al.

A communication system that uses direct sequence spread spectrum is commonly known as a direct sequence code division multiple access (DS/CDMA) system, in accordance with TIA/EIA standard IS-95. Individual users of the system use the same radio frequency (RF), but are separated by the use of individual spread codes. Exemplars of data transmission and reception in DS/CDMA systems may be found in Korean patent application No. 1994/20801 for a *Data Transceiver In Spread Spectrum Communication System Using Pilot Channel*; Korean patent application No. 1994/30497 for a *Data Transceiver In Spread Spectrum Multiple Access Communication Using Pilot Channel*; *Synchronous Transmitter And Receiver Of Spread Spectrum Communication Method*, U.S. Pat. No. 5,675,608 issued to Kim, et al.; and the *Data Transmitter And Receiver Of A Spread Spectrum Communication System Using A Pilot Channel*, U.S. Pat. No. 5,712,869 issued to Lee, et al.

One approach to spread spectrum communication contemplates offset quadrature phase shift keying (i.e., "OQPSK") direct sequence code division multiple access (i.e., "DS/CDMA" communication system. Typically, I-channel (or I-arm) input data is multiplied by an orthogonal code WI(t) to orthogonally modulate the I-channel input data DI(t), and Q-channel (or Q-arm) input data is multiplied by an orthogonal code in order to orthogonally modulate the Q-channel input data. The orthogonally modulated I- and Q-channel signals are gain controlled in gain controllers and then applied to a spectrum spreader constructed of a plurality of multipliers that multiply output from the gain controllers by an I-channel spreading sequence and a Q-channel spreading sequence. Adders and subtractors combine the output from the multipliers in order to generate an I-channel spread signal and a Q-channel spread signal. For example, a spreader may generates a difference between the signals output from the multipliers as an I-channel signal, and a sum of the signals output from the multipliers as the Q-channel signal.

Conventional spread spectrum circuits delay the Q-channel spread signal by one-half chip to prevent zero-crossing of the spread signals, in an effort to avoid zero-crossing of the transmission signals. It is generally believed that by avoiding zero-crossing, finite impulse response (i.e., FIR) filtered signals have a reduced regrowth of sidelobes after amplification by a non-linear circuit such as a power amplifier at a subsequent stage.

Code division multiple access systems modulate the user channel using the orthogonal code. The time and phase of the one channel signal should coincide with that of the other channel signal in order to maintain the orthogonality between the two channel signals. We have found, however, that unlike quadrature phase shift keyed, direct sequence code division multiple access (QPSK DS/CDMA) systems, an offset quadrature phase shift keyed, direct sequence code division multiple access (OQPSK DS/CDMA) system cannot maintain orthogonality between the I-channel signal and the Q-channel signal; we have found that this results in the occurrence of unacceptable phase error. That is, when an output signal of an offset quadrature phase shift keyed, direct sequence, code division multiple access system is demodulated at the receiver, the orthogonality between the I-channel signal and Q-channel signal cannot be maintained accurately even in the absence of channel noises. We have noticed that this inability to maintain orthogonality between the I-channel signal and the Q-channel signal causes phase error due to interference between the channels; this results in degradation of the performance of the system.

SUMMARY OF THE INVENTION

It is, therefore, an object of the present invention to provide an improved spread spectrum communication process and circuit.

It is still another object to provide a spread spectrum apparatus and method capable of maintaining orthogonality between transmission signals in a code division multiple access communication system.

It is yet another object to provide processes and apparatus enabling code division multiple access communication in spread spectrum communications.

It is still yet another object to provide processes and circuits able to improve maintenance of orthogonality between channel signals by detecting zero-crossing during code division multiple access communication.

It is another object of the present invention to provide an apparatus and method capable of avoiding zero-crossing while maintaining an orthogonality by determining whether or not zero-crossing occurs, outputting spread spectrum signals as they are when zero-crossing does not occur and randomly delaying the spread spectrum signals when the zero-crossing occurs in a code division multiple access communication system.

These and other objects may be attained with a spread spectrum apparatus in a code division multiple access communication system. In the spread spectrum apparatus, a spreader combines first and second input signals with corresponding pseudo-random noise sequences to generate first and second spread signals. A zero-crossing detector determines whether zero-crossing occurs between the first spread signal and the second spread signal, to generate a zero-crossing detection signal. A first delay staggers the first spread signal in a first direction and a second delay staggers the second spread signal in a second direction. A first selector selects one of the first spread signal and a first staggered signal output from the first delay in response to the zero-crossing detection signal, and a second selector selects one of the second spread signal and a second staggered signal output from the second delay in response to the zero-crossing detection signal. Therefore, the first and second staggered signals are selected when the zero-crossing occurs, and the first and second spread signals are selected when the zero-crossing does not occur, thereby maintaining an orthogonality of transmission signals. Here, the first channel is an in-phase channel and the second channel is a quadrature phase channel.

Preferably, the first delay shifts the first spread signal in a positive direction by a preset chip and the second delay shifts the second spread signal in a negative direction by a preset chip. For example, the first delay shifts the first spread signal by +¼ chip and the second delay shifts the second spread signal by −¼ chip.

BRIEF DESCRIPTION OF THE DRAWINGS

The above and other objects, features and advantages of the present invention will become more apparent from the following detailed description when taken in conjunction with the accompanying drawings in which like reference numerals indicate like parts, with.

DETAILED DESCRIPTION OF THE PREFERRED EMBODIMENT

Figure 1:
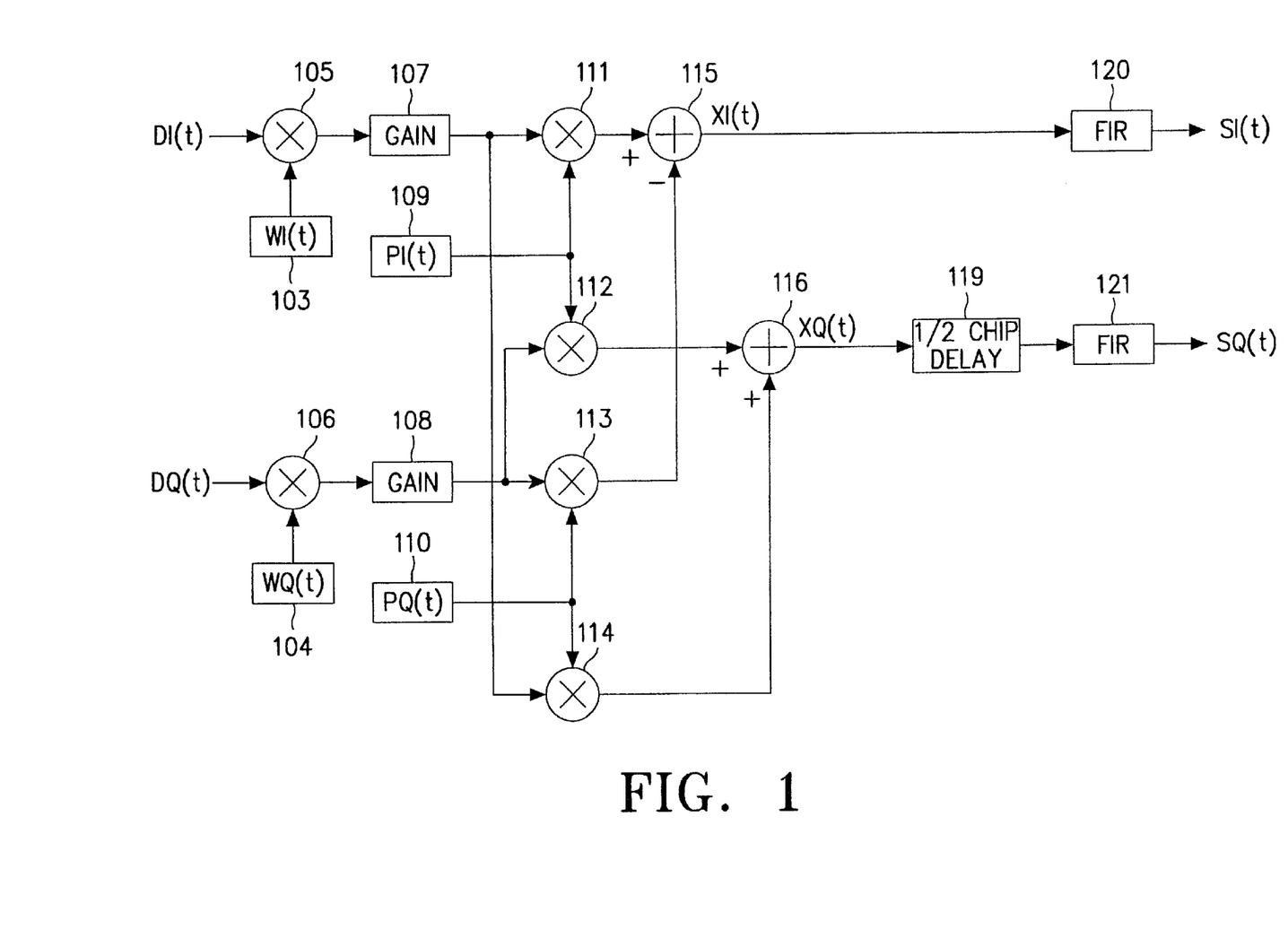
FIG. 1 is a diagram illustrating a spread spectrum apparatus representative of a code division multiple access communication system operating without benefit of the principles of the present invention.

Turning now to the drawings, FIG. 1 illustrates a structure of a spread spectrum apparatus for an offset quadrature phase shift keying (i.e., a "OQPSK") direct sequence code division multiple access (i.e., a "DS/CDMA" communication system). A multiplier 105 multiplies I-channel (or I-arm) input data DI(t) by an orthogonal code WI(t) to orthogonally modulate the I-channel input data DI(t), and a multiplier 106 multiplies Q-channel (or Q-arm) input data DQ(t) by an orthogonal code WQ(t) to orthogonally modulate Q-channel input data DQ(t). The orthogonally modulated I- and Q-channel signals are gain controlled in gain controllers 107 and 108, respectively, and then applied to a spreader.

The spreader may be constructed with a plurality of multipliers 111, 112, 113 and 114. Multiplier 111 multiplies the output of gain controller 107 by an I-channel spreading sequence PI(t); multiplier 112 multiplies an output of gain controller 108 by I-channel spreading sequence PI(t), multiplier 113 multiplies an output of gain controller 108 by a Q-channel spreading sequence PQ(t) and multiplier 114 multiplies an output of gain controller 107 by Q-channel spreading sequence PQ(t). Subtractor 115 subtracts an output of multiplier 113 from an output of multiplier 111 to generate an I-channel spread signal XI(t), and adder 116 adds an output of multiplier 112 to an output of multiplier 114 to generate a Q-channel spread signal XQ(t). That is, spreader generates a signal representative of difference between signals output from multipliers 111 and 113 as I-channel signal XI(t), and a signal representative of sum of signals output from multipliers 112 and 114 as Q-channel signal XQ(t).

Thereafter, offset quadrature phase shift keying direct sequence code division multiple access communication system delays Q-channel spread signal XQ(t) by one-half chip using delay 119 prior to filtering spread signals XI(t) and XQ(t) through finite impulse response (i.e., a FIR) filters 120 and 121. That is, I-channel spread signal XI(t) is converted to an I-channel transmission signal SI(t) through FIR filter 120, and Q-channel spread signal XQ(t) is delayed by one-half chip through delay 119 and then converted to a Q-channel transmission signal SQ(t) through FIR filter 121. This spread spectrum apparatus delays Q-channel spread signal XQ(t) by one-half chip to prevent zero-crossing of spread signals XI(t) and XQ(t), and to avoid zero-crossing of transmission signals SI(t) and SQ(t). By avoiding zero-crossing, finite impulse response filtered signals exhibit reduced regrowth of sidelobe after being amplified by a non-linear circuit such as a power amplifier in a subsequent stage.

Code division multiple access systems modulate a user channel with an orthogonal code. The time and phase of one channel signal should coincide with that of other channel signal in order to maintain orthogonality between two channel signals. Accordingly, we have found that, unlike a quadrature phase shift keying direct sequence code division multiple access system, the offset quadrature phase shift keying direct sequence code division multiple access system shown in FIG. 1 cannot maintain orthogonality between I-channel signal XI(t) and Q-channel signal XQ(t); this causes phase error. That is, when an output signal of the offset quadrature phase shift keying direct sequence code division multiple access system illustrated by FIG. 1 is demodulated by a receiver, orthogonality between I-channel signal and Q-channel signal is not maintained accurately, even in absence of channel noises. This causes phase error due to interference between channels, and results in degradation of performance of the system.

An offset quadrature phase shift keying direct sequence code division multiple access system constructed according to principles of the present invention optimally maintains orthogonality between an I-channel signal and a Q-channel signal in order to minimize phase error and avoid zero-crossing, and thereby prevent regrowth of sidelobe. An exemplary embodiment determines whether or not zero-crossing occurs, outputs an I-channel signal and a Q-channel spread signal, as they are, when zero-crossing does not occur, and randomly staggers I-channel signal and Q-channel spread signal when zero-crossing occurs, thereby avoiding zero-crossing and optimally maintaining orthogonality between the I-channel signal and the Q-channel spread signal.

Figure 2:
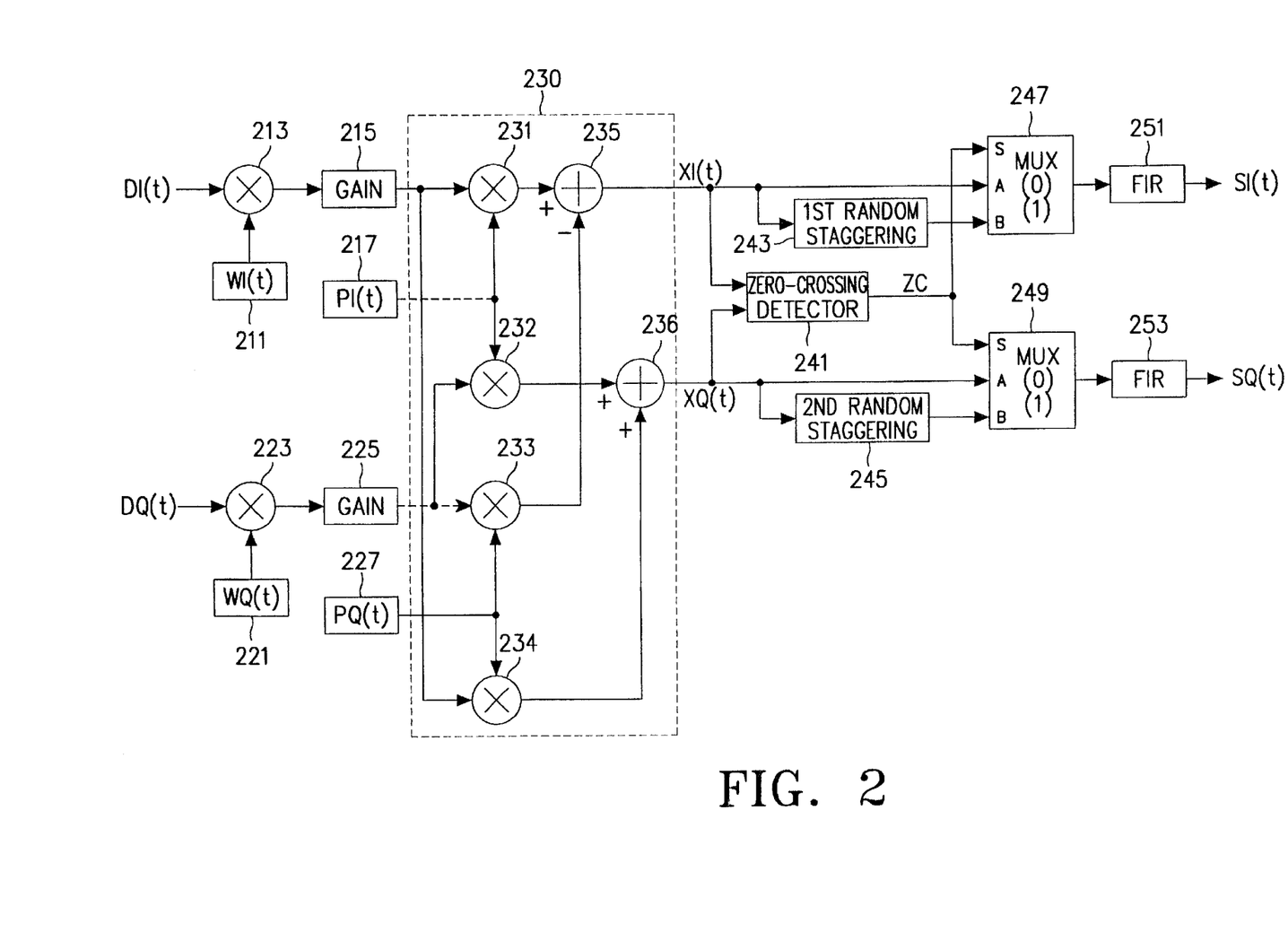
FIG. 2 is a diagram illustrating a spread spectrum apparatus of a CDMA communication system constructed as an embodiment of the present invention.

FIG. 2 illustrates a spread spectrum apparatus for an offset quadrature phase shift keying direct sequence code division multiple access system according to an embodiment of present invention. Orthogonal code generators 211 and 221 generate an I-channel orthogonal code WI(t) and a Q-channel orthogonal code WQ(t), respectively. In this embodiment, Walsh codes may be used for orthogonal codes, as may be found in the *Data Transmitter And Receiver Of A Spread Spectrum Communication System Using A Pilot Channel,* U.S. Pat. No. 5,712,869 issued to Byeong-Ho Lee and Jong-Hyeon Park on the $27^{th}$ of January 1998. Multiplier 213 multiplies an I-channel input signal DI(t) by orthogonal code WI(t) and outputs an orthogonally modulated signal DI(t)*WI(t). Multiplier 223 multiplies a Q-channel input signal DQ(t) by orthogonal code WQ(t) and outputs an orthogonally modulated signal DQ(t)*WQ(t). Multipliers 213 and 223 perform orthogonal modulation. Gain controller 215 controls gain of orthogonally modulated I-channel signal from multiplier 213. Gain controller 225 controls a gain of orthogonally modulated Q-channel signal from multiplier 223.

Pseudo-random noise (i.e., PN) sequence generators 217 and 227 generate an I-channel PN sequence PI(t) and a Q-channel PN sequence PQ(t), respectively. Spreader 230 multiplies orthogonally modulated I- and Q-channel signals from gain controllers 215 and 225 by PN sequences PI(t) and PQ(t), to spread orthogonally modulated I- and Q-channel signals. In spreader 230, multiplier 231 multiplies orthogonally modulated I-channel signal DI(t)*WI(t) from gain controller 215 by PN sequence PI(t) and outputs a signal DI(t)*WI(t)*PI(t). Multiplier 232 multiplies orthogonally modulated Q-channel signal DQ(t)*WQ(t) from gain controller 225 by PN sequence PI(t) and outputs a signal DQ(t)*WQ(t)*PI(t). Multiplier 233 multiplies orthogonally modulated Q-channel signal DQ(t)*WQ(t) output from gain controller 225 by PN sequence PQ(t) and outputs a signal DQ(t)*WQ(t)*PQ(t). Multiplier 234 multiplies orthogonally modulated I-channel signal DI(t)*WI(t) by PN sequence PQ(t) and outputs a signal DI(t)*WI(t)*PQ(t). Subtractor 235 subtracts an output of multiplier 233 from an output of multiplier 231 and outputs an I-channel spread signal XI(t). Here, XI(t)=DI(t)*WI(t)*PI(t)−DQ(t)*WQ(t)*PQ(t). Adder 236 adds an output of multiplier 232 to an output of multiplier 234 and outputs a Q-channel spread signal XQ(t). Here, XQ(t)=DQ(t)*WQ(t)*PI(t)+DI(t)*WI(t)*PQ(t).

A zero-crossing detector 241 receives spread signals XI(t) and XQ(t) and determines whether a zero-crossing occurs between those two signals so as to generate a zero-crossing detection signal ZC according to the determination. The term "delay" used in this specification refers to both retardation and advancement of a signal, and the term "random staggering" also has the same meaning. Here, retardation or advancement of a signal means shifting the signal in a positive or negative direction on a time axis. Additionally, a "random staggering part" used in construction of the embodiment has the same function as a normal delay. First random staggering part 243 delays (i.e., retards or advances) I-channel spread signal XI(t) by a given chip unit. Second random staggering part 245 delays Q-channel spread signal XQ(t) by given chip unit. Selector 247 has a first input node A receiving I-channel spread signal XI(t), a second input node B receiving an output of first random staggering part 243 and a select node S receiving zero-crossing detection signal ZC output from zero-crossing detector 241. The selector 247 selects I-channel spread signal XI(t) when zero-crossing detection signal ZC represents nonoccurrence of zero-crossing, and selects the output of first random staggering part 243 when zero-crossing detection signal ZC represents occurrence of zero-crossing. Selector 249 has a first input node A receiving Q-channel spread signal XQ(t), a second input node B receiving an output of second random staggering part 245 and a select node S receiving zero-crossing detection signal ZC output from zero-crossing detector 241. The selector 249 selects Q-channel spread signal XQ(t) when zero-crossing detection signal ZC represents nonoccurrence of zero-crossing, and selects the output of second random staggering part 245 when zero-crossing detection signal ZC represents occurrence of zero-crossing. FIR filter 251 FIR filters an output of selector 247 and outputs a transmission signal SI(t). FIR filter 253 FIR filters an output of selector 249 and outputs a transmission signal SQ(t).

In operation, multiplier 213 multiplies I-channel input signal DI(t) by orthogonal code WI(t) to orthogonally modulate I-channel input signal DI(t), and multiplier 223 multiplies Q-channel input signal DQ(t) by orthogonal code WQ(t) to orthogonally modulate Q-channel input signal DQ(t). The orthogonally modulated I- and Q-channel signals are gain controlled in gain controllers 215 and 225, respectively, and are then spread into spread signals XI(t) and XQ(t) in spreader 230.

For generating spread signals XI(t) and XQ(t), multiplier 231 multiplies the orthogonally modulated I-channel signal output from gain controller 215 by PN sequence PI(t) to generate a spread signal, and multiplier 233 multiplies the orthogonally modulated Q-channel signal output from gain controller 225 by PN sequence PQ(t) to generate a spread signal. Subtractor 235n calculates the difference between spread signals output from multipliers 231 and 233 and outputs the difference as I-channel spread signal XI(t). Also, multiplier 232 multiplies the orthogonally modulated Q-channel signal output from gain controller 225 by PN sequence PI(t) to generate a spread signal, and a multiplier 234 multiplies the orthogonally modulated I-channel signal output from gain controller 215 by PN sequence PQ(t) to generate a spread signal. Adder 236n adds the spread signals output from multipliers 232 and 234 to output Q-channel spread signal XQ(t).

The OQPSK DS/CDMA system practiced according to principles of the present invention detects zero-crossing of spread signals XI(t) and XQ(t) prior to FIR filtering, and performs OQPSK modulation when zero-crossing is detected. That is, when zero-crossing occurs between spread signals XI(t) and XQ(t), the DS/CDMA system performs OQPSK modulation to maintain ½ chip offset between I-channel signal XI(t) and Q-channel signal XQ(t), thereby preventing zero-crossing between I-channel transmission signal SI(t) and Q-channel transmission signal SQ(t). When zero-crossing does not occur between spread signals XI(t) and XQ(t), however, DS/CDMA system performs QPSK modulation to optimally maintain orthogonality between I-channel signal XI(t) and Q-channel signal XQ(t), thereby minimizing phase error.

Here, zero-crossing detector 241 determines whether or not zero-crossing occurs between spread signals XI(t) and XQ(t), and generates zero-crossing detection signal ZC=0 when zero-crossing does not occur. As a result, the system serves as a QPSK DS/CDMA system. In this case, selector 247 selects spread signal XI(t) and FIR filter 251 filters selected spread signal XI(t) to output transmission signal SI(t). Likewise, selector 249 selects spread signal XQ(t) and FIR filter 253 filters selected spread signal XQ(t) to output transmission signal SQ(t).

Figure 3:
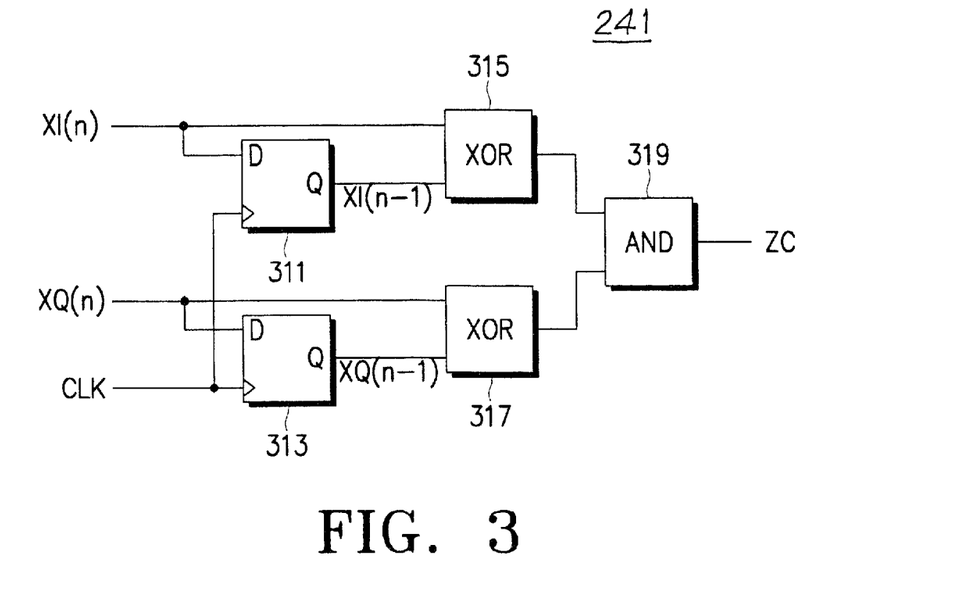
FIG. 3 is a diagram illustrating a zero-crossing detector that may be used in the circuit of FIG. 2 when constructed as a first embodiment of the present invention.
Figure 4:
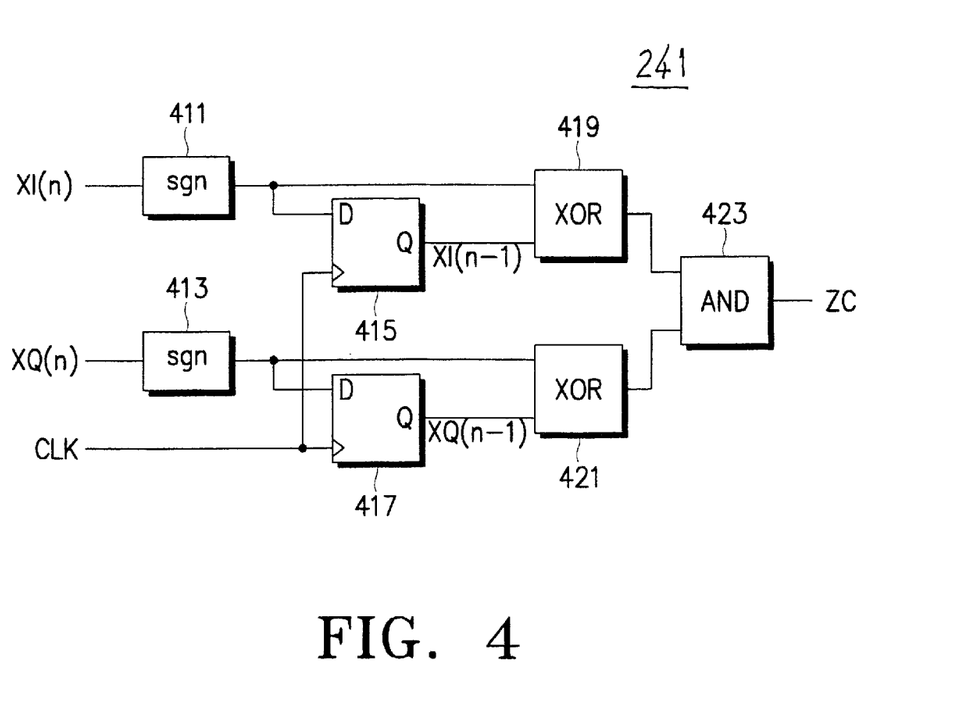
FIG. 4 is a diagram illustrating a zero-crossing detector that may be used in the circuit of FIG. 2 when constructed as a second embodiment of the present invention.
Figure 5:
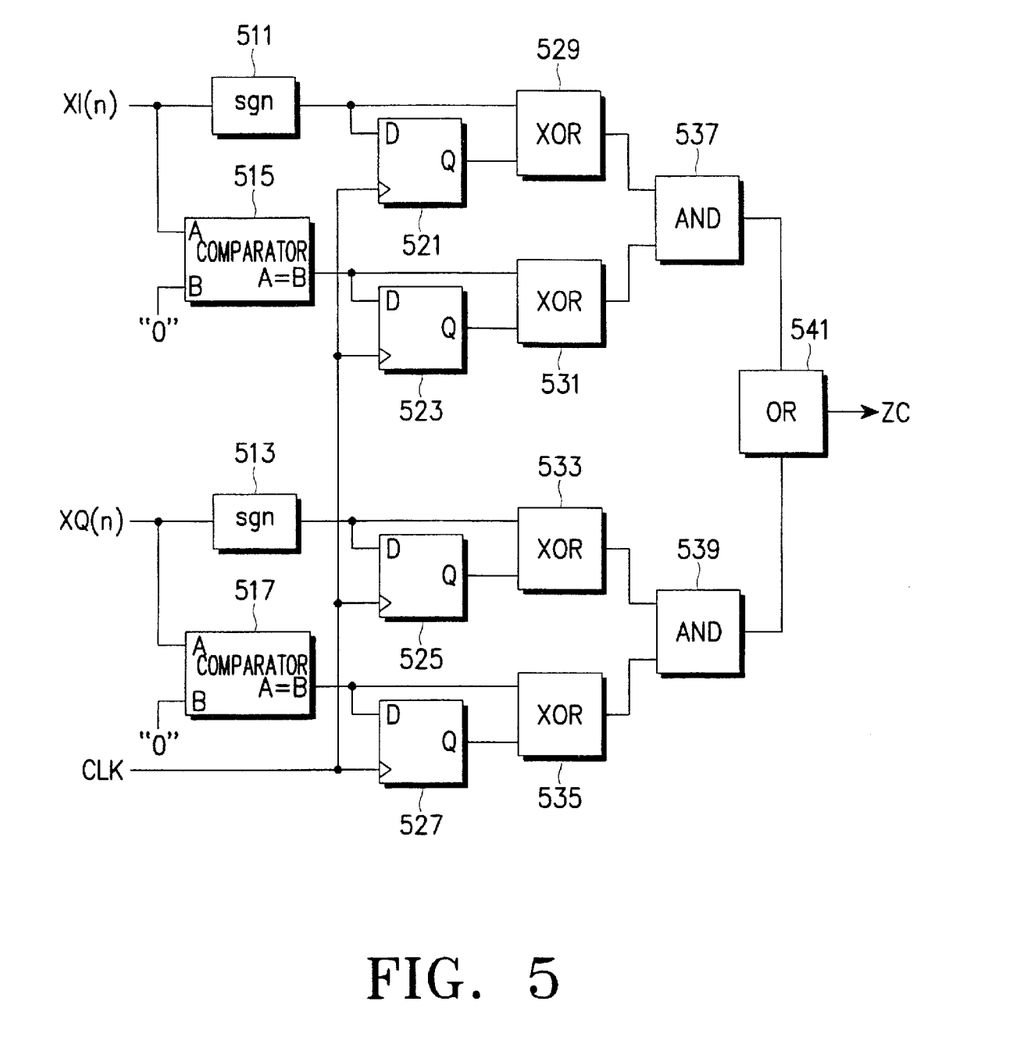
FIG. 5 is a diagram illustrating a zero-crossing detector that maybe used in the circuit of FIG. 2 when constructed as a third embodiment of the present invention.

FIGS. 3, 4 and 5 illustrate zero-crossing detector 241 constructed as different embodiments of the present invention. FIG. 3 shows zero-crossing detector for the case where spread signals XI(t) and XQ(t) have binary values, FIG. 4 shows zero-crossing detector for the case where spread signals XI(t) and XQ(t) have multi-level values, and FIG. 5 shows zero-crossing detector for the case where spread signals XI(t) and XQ(t) have multi-level values and one of the spread signals has a zero value. Such a zero-crossing detector 214 determines whether or not spread signals XI(t) and XQ(t) cross zero point so as to output ZC=1 when they cross zero point and output ZC=0 when they do not cross zero point.

Referring to FIG. 3, when spread signals XI(t) and XQ(t) have binary values, zero-crossing detector 241 detects case where (n−1)th spread signals XI(n−1) and XQ(n—1) and nth spread signals XI(n) and XQ(n) change their levels simultaneously. That is, a flip-flop 311 delays signal XI(n) by one clock period to output signal XI(n−1) and a flip-flop 313 delays signal XQ(t) by one clock period to output signal XQ(n−1). An exclusive OR gate 315 exclusively ORs signal XI(n) and signal XI(n−1), and an exclusive OR gate 317 exclusives ORs signal XQ(n) and signal XQ(n−1). An AND gate 319 ANDs outputs of exclusive OR gates 315 and 317 to output zero-crossing detection signal ZC.

The zero-crossing detector 241 of FIG. 3 detects zero-crossing and outputs zero-crossing detection signal ZC=1, when XI(n)=1 and XQ(n)=1 for XI(n−1)=0 and XQ(n−1)=0, when XI(n)=1 and XQ(n)=0 for XI(n−1)=0 and XQ(n−1)=1, when XI(n)=0 and XQ(n)=1 for XI(n−1)=1 and XQ(n−1)=0, or when XI(n)=0 and XQ(n)=0 for XI(n−1)=1 and XQ(n−1)=1. Otherwise, zero-crossing detector 241 outputs zero-crossing detection signal ZC=0.

Next, referring to FIG. 4, when signal XI(t) and signal XQ(t) are multi-level signals, zero-crossing detector 241 detects case where (n−1)th signals XI(n−1) and XQ(n−1) and nth signals XI(n) and XQ(n) change their signs simultaneously. Sign bit detectors 411 and 413 detect most significant bits (MSBs) of signals XI(n) and XQ(n) and output them as sign bits. Flip-flop 415 delays sign bit of signal XI(n) by one clock period to output a sign bit of signal XI(n−1), and a flip-flop 417 delays sign bit of signal XQ(n) by one clock period to output a sign bit of signal XQ(n−1). Exclusive OR gate 419 exclusively ORs sign bits of signals XI(n) and XI(n−1), and exclusive OR gate 421 exclusively ORs sign bits of signals XQ(n) and XQ(n−1). AND gate 423 ANDs outputs of exclusive OR gates 419 and 421 to output zero-crossing detection signal ZC.

Accordingly, zero-crossing detector of FIG. 4 detects zero-crossing and outputs zero-crossing detection signal ZC=1, when sgn[XI(n),XQ(n)]=−,− for sgn[XI(n−1),XQ(n−1)]=+,+, when sgn[XI(n),XQ(n)]=−,+ for sgn[XI(n−1),XQ(n−1)]=+,−, when sgn[XI(n),XQ(n)]=+,− for sgn[XI(n−1),XQ(n−1)]=−,+, or when sgn[XI(n),XQ(n)]=+,+ for sgn[XI(n−1),XQ(n−1)]=−,−. Here, sgn(X,Y) corresponds to an operation for taking signs of signals "X" and "Y". Otherwise, zero-crossing detector 241 outputs zero-crossing detection signal ZC=0. In most cases, sign bit detectors 411 and 413 take most significant bit to detect sign bit.

Moreover, referring to FIG. 5, when spread signals XI(t) and XQ(t) are multi-level signals and one of the signals has a zero value, zero-crossing detector 241 detects the case where (n−1)th signal XI(n−1) or XQ(n−1) having a non-zero value changes its sign at nth signal XI(n) or XQ(n).

Sign detector 511 detects the most significant bit of spread signal XI(n) and outputs the detected bit as a sign bit. Comparator 515 compares spread signal XI(n) with a signal of value "0". Flip-flop 521 delays the sign bit of spread signal XI(n) by one clock period to output a sign bit of signal XI(n−1). Flip-flop 523 delays an output of comparator 515 by one clock period. Exclusive OR gate 529 exclusively ORs the sign bits of spread signals XI(n) and XI(n−1). Exclusive OR gate 531 exclusively ORs an output of comparator 515 and an output of flip-flop 523; and AND gate 537 ANDs the outputs of exclusive OR gates 529 and 531.

Sign detector 513 detects the most significant bit of spread signal XQ(n) and outputs the detected bit as a sign bit. Comparator 517 compares the spread signal XQ(n) with a signal of value "0". Flip-flop 525 delays the sign bit of spread signal XQ(n) by one clock period to output a sign bit of signal XQ(n−1). Flip-flop 527 delays an output of comparator 517 by one clock period. Exclusive OR gate 533 exclusively ORs the sign bits of spread signals XQ(n) and XQ(n−1). Exclusive OR gate 535 exclusively ORs an output of comparator 517 and an output of flip-flop 527, and AND gate 539 ANDs the outputs of exclusive OR gates 533 and 535.

OR gate 541 ORs the outputs of AND gates 537 and 539 to output zero-crossing detection signal ZC. Accordingly, zero-crossing detector 241 of FIG. 5 detects zero-crossing and outputs zero-crossing detection signal ZC=1, when XI(n)=0 and sgn [XQ(n)=− for XI(n−1)=0 and sgn [XQ(n−1)=+, when XI(n)=0 and sgn [XQ(n)=+ for XI(n−1)=0 and sgn [XQ(n−1)=−, when sgn [XI(n)=− and XQ(n)=0 for sgn [XI(n−1)=+ and XQ(n−1)=0, or when sgn [XI(n)=+ and XQ(n)=0 for sgn [XI(n−1)=− and XQ(n−1)=0. Here, sgn(X) corresponds to an operation for taking the sign of signal "X". Otherwise, zero-crossing detector 241 outputs zero-crossing detection signal ZC=0. In most cases, sign detectors 511 and 513 take the most significant bit to detect the sign bit.

Moreover, in addition to the structures shown in FIGS. 3, 4 and 5, it is also possible to construct a similar zero-crossing detector in the event that spread signals XI(t) and XQ(t) undergo conceptual zero-crossing. Zero-crossing detector 241 determines whether or not zero-crossing occurs between spread signals XI(t) and XQ(t) and generates zero-crossing detection signal ZC=1 when occurrence of zero-crossing is detected. When ZC=1, the system serves as an OQPSK DS/CDMA system. In this case, selector 247 selects spread signal XI(t) which is retarded or advanced by a chip unit in first random staggering part 243, and FIR filter 251 filters the output of first random staggering part 243 to output transmission signal SI(t). Furthermore, selector 249 selects spread signal XQ(t) that has been retarded or advanced by a chip unit in second random staggering stage 245, and FIR filter 253 filters the output of second random staggering stage 245 to output transmission signal SQ(t). Assuming that the I-channel signal and Q-channel signal should have a one-half chip phase difference, first random staggering stage 243 and second random staggering stage 245 can be realized in several methods as follows.

In a first technique, a random number is generated. When the generated random number is a positive number (+), spread signal XI(t) is delayed by +¼ chip and spread signal XQ(t) is delayed by −¼ chip, thus maintaining ½ chip difference between spread signals XI(t) and XQ(t). On the contrary, when the generated random number is a negative number (−), spread signal XI(t) is delayed by −¼ chip and spread signal XQ(t) is delayed by +¼ chip, thus maintaining ½ chip difference between spread signals XI(t) and XQ(t).

In a second technique, a random number is generated. When the generated random number is a positive number (+), spread signal XI(t) is delayed by −¼ chip and spread signal XQ(t) is delayed by +¼ chip, thus maintaining ½ chip difference between spread signals XI(t) and XQ(t). On the contrary, when the generated random number is a negative number (−), spread signal XI(t) is delayed by +¼ chip and spread signal XQ(t) is delayed by −¼ chip, thus maintaining ½ chip difference between spread signals XI(t) and XQ(t).

Figure 6:
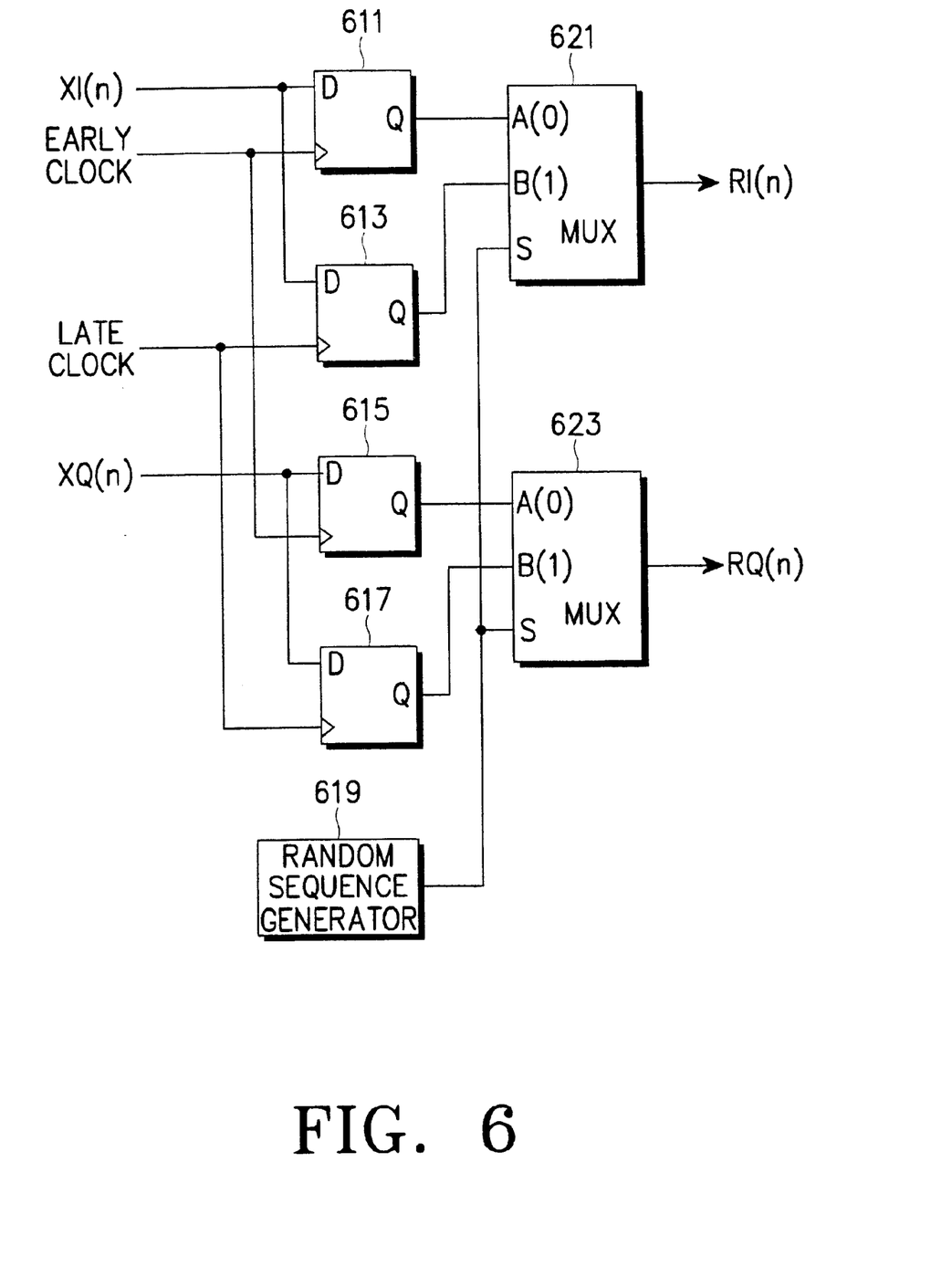
FIG. 6 is a diagram illustrating a random staggering stage that may be used in the construction of the circuit shown by FIG. 2, as an embodiment of the present invention.

FIG. 6 illustrates the structure of random staggering part 243 (or 245). Referring to FIG. 6, to maintain ½ chip difference between I-channel signal and Q-channel signal, an early clock CK1 is advanced by +¼ chip with respect to a reference clock and a late clock CK2 is retarded by −¼ chip with respect to reference clock. A random sequence generator 619 generates random sequences. Here, random sequence generator 619 can be a pseudo-random noise (PN) sequence generator. In the figure, flip-flops 611 and 613 and a selector 621 constitute first random staggering part 243, and flip-flops 615 and 617 and a selector 623 constitute second random staggering part 245.

In operation, a signal RI(n) is delayed by +/−¼ chip with respect to spread signal XI(n) at a reference time and a signal RQ(n) is delayed by −/+¼ chip with respect to spread signal XQ(n) at a reference time, according to an output of random sequence generator 619. Accordingly, signals RI(n) and RQ(n) also have ½ chip difference. Although zero-crossing occurs between signals XI(n) and XQ(n), ½ chip difference between signals RI(n) and RQ(n) is maintained, avoiding zero-crossing.

Figure 7:
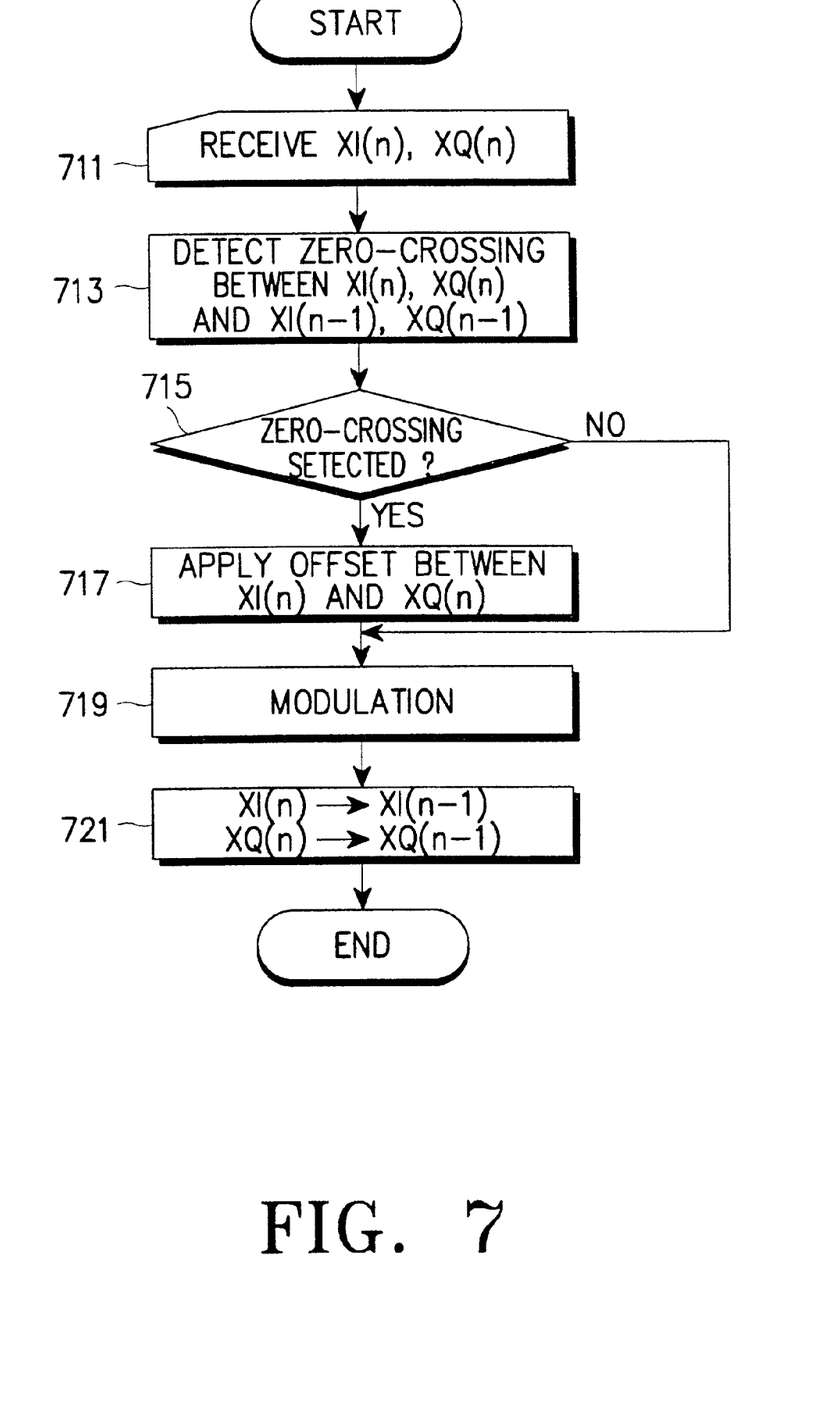
FIG. 7 is a flowchart illustrating a procedure for controlling an output of the spread signals according to whether or not a zero-crossing occurs in the spread spectrum apparatus of a code division multiple access communication system constructed as an embodiment of the present invention.

FIG. 7 is a flowchart illustrating a procedure for determining whether or not zero-crossing occurs between two different channel signals in a code division multiple access (CDMA) communication system according to the present invention. As new I- and Q-channel signals XI(n) and XQ(n) are received in step 711, current I- and Q-channel signals XI(n) and XQ(n) and previous I- and Q-channel signals XI(n−1) and XQ(n−1) are analyzed in step 713. It is determined in step 715 whether zero-crossing occurs between I-channel signals XI(n) and XI(n−1) and Q-channel signals XQ(n) and XQ(n−1), in the manner shown in FIGS. 3, 4 and 5. When it is determined in step 715 that zero-crossing does not occur between I-channel signals and Q-channel signals, current input signals XI(n) and XQ(n) are output as transmission signals without offset, in step 719. After modulating input signals without offset, signals XI(n) and XQ(n) are stored as signals XI(n−1) and XQ(n−1), respectively, preparing for next state.

When zero-crossing occurs between I-channel signal XI(n) and Q-channel signal XQ(n) in step 715, however, I-channel signal XI(n) and Q-channel signal XQ(n) are so controlled as to have offset by a chip unit. For offset, it is possible to provide a preset offset by staggering signals XI(n) and XQ(n) in different directions or by staggering one of signals XI(n) and XQ(n) by a preset value. In addition, it is possible to provide desired offset by staggering signals XI(n) and XQ(n) by a fixed value or a random value. When signals XI(n) and XQ(n) are so staggered as to have offset value, zero-crossing between signals XI(n) and XQ(n) does not occur. Then, in step 719, signals XI(n) and XQ(n), which are offset by a predetermined value, are modulated and output as transmission signals. After offsetting input signals to modulate them, signals XI(n) and XQ(n) are stored as signals XI(n−1) and XQ(n−1), respectively, preparing for the next state.

Accordingly, the spread spectrum apparatus according to the present invention includes a scheme for detecting zero-crossing of I (In-phase) channel signal and Q (Quadrature-phase) channel signal, to provide, when zero-crossing occurs, a difference (or offset) between I-channel signal and Q-channel signal in order to prevent I- and Q-channel signals from being changed simultaneously, and to transmit I- and Q-channel signals, as they are, when zero-crossing does not occur. Thus, the embodiment transmits channel signals, as they are, when zero-crossing does not occur between two channel signals, and provides an offset between I- and Q-channel signals to prevent zero-crossing before transmission, when zero-crossing occurs. That is, this embodiment detects occurrence of zero-crossing between the I-channel signal and Q-channel signal, to provide an offset therebetween before transmission, only when zero-crossing occurs.

Here, to provide an offset between the I-channel signal and Q-channel signal, the embodiment includes random staggering parts 243 and 244 on I-channel and Q-channel, respectively, as shown in FIG. 2, and delays corresponding channel signals, for example, by ¼ chip using random staggering parts 243 and 245. It can be understood, however, that a signal retardation or advancement technique can be used in place of a signal random staggering technique. That is, it is possible to use a technique for fixedly delaying I-channel signal by +¼ chip and Q-channel signal by −¼ chip, upon detection of zero-crossing. In addition, when time T is shorter than one chip time, it is also possible to delay (retard or advance) I-channel signal by +T and Q-channel signal by −T, instead of ¼ chip.

Figure 8:
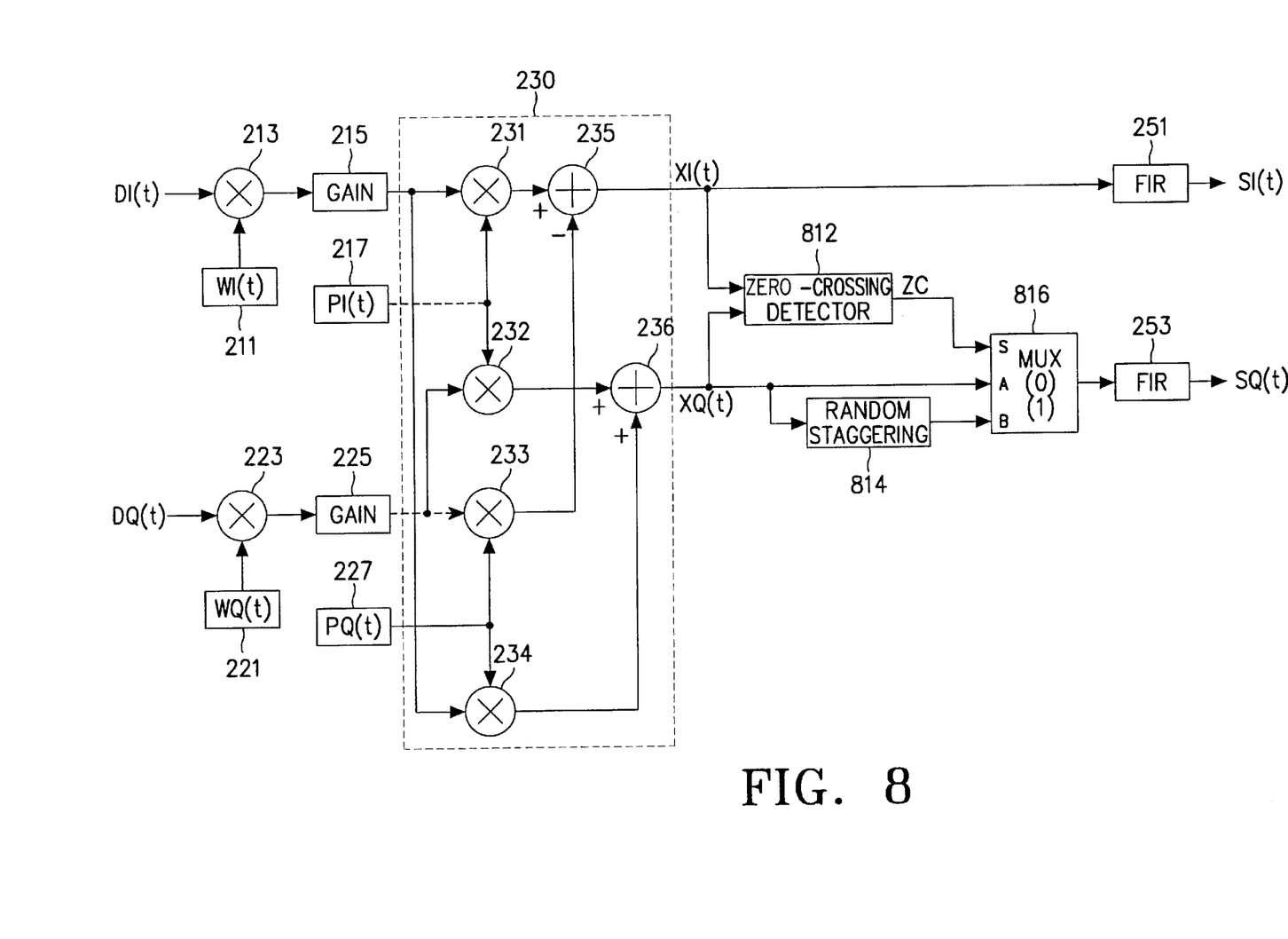
FIG. 8 is a diagram illustrating a spread spectrum circuit constructed as another embodiment of the present invention.

Moreover, it is also possible to connect the random staggering part to a selected one of the I-channel and Q-channel, instead of connecting random staggering parts both to I-channel and Q-channel. FIG. 8 illustrates a spread spectrum apparatus having random staggering part only on the Q-channel.

Referring to FIG. 8, orthogonal code generators 211 and 221 generate I-channel orthogonal code WI(t) and Q-channel orthogonal code WQ(t), respectively. In this embodiment, Walsh codes may be used for orthogonal codes. Multiplier 213 multiplies I-channel input signal DI(t) by orthogonal code WI(t) and outputs an orthogonally modulated signal DI(t)*WI(t). Multiplier 223 multiplies Q-channel input signal DQ(t) by orthogonal code WQ(t) and outputs an orthogonally modulated signal DQ(t)*WQ(t). Multipliers 213 and 223 perform orthogonal modulation. Gain controller 215 controls the gain of orthogonally modulated I-channel signal from multiplier 213. Gain controller 225 controls a gain of orthogonally modulated Q-channel signal from multiplier 223.

Pseudo-random noise (PN) sequence generators 217 and 227 generate I-channel PN sequence PI(t) and Q-channel PN sequence PQ(t), respectively. Spreader 230 multiplies orthogonally modulated I- and Q-channel signals output from gain controllers 215 and 225 by PN sequences PI(t) and PQ(t), respectively, to spread orthogonally modulated I- and Q-channel signals. In spreader 230, multiplier 231 multiplies orthogonally modulated I-channel signal DI(t)*WI(t) from gain controller 215 by PN sequence PI(t) and outputs a signal DI(t)*WI(t)*PI(t). Multiplier 232 multiplies orthogonally modulated Q-channel signal DQ(t)*WQ(t) from gain controller 225 by PN sequence PI(t) and outputs a signal DQ(t)*WQ(t)*PI(t). Multiplier 233 multiplies orthogonally modulated Q-channel signal DQ(t)*WQ(t) from gain controller 225 by PN sequence PQ(t) and outputs a signal DQ(t)*WQ(t)*PQ(t). Multiplier 234 multiplies orthogonally modulated I-channel signal DI(t)*WI(t) by PN sequence PQ(t) and outputs a signal DI(t)*WI(t)*PQ(t). Subtractor 235 subtracts an output of multiplier 233 from an output of multiplier 231 and outputs an I-channel spread signal XI(t). Here, XI(t) =DI(t)*WI(t)*PI(t)–DQ(t)*WQ(t)*PQ(t). Adder 236 adds an output of multiplier 232 to an output of multiplier 234 and outputs a Q-channel spread signal XQ(t). Here, XQ(t)=DQ(t)*WQ(t)*PI(t)+DI(t)*WI(t)*PQ(t).

A zero-crossing detector 812 receives spread signals XI(t) and XQ(t) and determines whether zero-crossing occurs between the two signals so as to generate a zero-crossing detection signal ZC according to the determination. Zero-crossing detector 812 may have the same structure and operation as that shown in FIGS. 3, 4 and 5. A random staggering part 814 retards or advances the Q-channel signal by a chip unit. Random staggering part 814 may have the same structure and operation as that shown in FIG. 6. Here, random staggering part 814 can retard or advance Q-channel signal XQ(t) by ½ chip unit. A selector 816 has a first input node A receiving Q-channel spread signal XQ(t), a second input node B receiving an output of random staggering part 812 and a select node S receiving zero-crossing detection signal ZC from zero-crossing detector 812. Selector 816 selects Q-channel spread signal XQ(t) when zero-crossing detection signal ZC represents nonoccurrence of zero-crossing, and selects the output of second random staggering part 816 when zero-crossing detection signal ZC represents occurrence of zero-crossing. FIR filter 251 FIR filters an output of subtractor 235 and outputs a transmission signal SI(t); FIR filter 253 FIR filters an output of selector 816 and outputs a transmission signal SQ(t).

When zero-crossing occurs, the spread spectrum apparatus of FIG. 8 delays the Q-channel signal by ½ chip unit to avoid zero-crossing. When zero-crossing does not occur, however, the I-channel signal and Q-channel signal are transmitted as they are (without delay) in the same manner as described in FIG. 2. Although FIG. 8 shows an exemplary structure in which random staggering part is connected to the Q-channel, it is also possible to connect the random staggering part to the I-channel.

Although the present invention has been described with reference to direct sequence, code division multiple access (DS/CDMA) systems that selectively use either quadrature phase shift keyed (QPSK) or offset quadrature phase shift keyed (OQPSK) modulation according to zero-crossing detection, the principles of the present invention may also be applied to a non-DS/CDMA system which mixedly uses QPSK and OQPSK modulation. In this case, signals from FIR filters 251 and 253 are input as I- and Q-channel signals of QPSK modulator, respectively.

As described in the foregoing paragraphs, an offset quadrature phase shift keying, direct sequence, code division multiple access system, when practiced according to the principles of the present invention, detects occurrence of zero-crossing between spread signals of I-channel and Q-channel, uses quadrature phase shift keyed modulation (QPSK) to maintain orthogonality between channels when zero-crossing does not occur, and uses offset quadrature phase shift keyed (OQPSK) modulation by random staggering to avoid zero-crossing between spread signals when zero-crossing occurs. Accordingly, it is possible to prevent regrowth of sidelobe and to minimize phase error due to non-orthogonality between I-channel signal and Q-channel signal, a drawback of offset quadrature phase shift keyed (OQPSK) modulation.

While the invention has been shown and described with reference to a certain preferred embodiment, it will be understood by those skilled in art that various changes in form and details may be made without departing from spirit and scope of invention as defined by appended claims.

What is claimed is:

1. A modulation apparatus, comprising:
   a zero-crossing detector for determining whether zero-crossing occurs between a first input signal and a second input signal;
   delay means for delaying at least one of the first input signal and the second input signal to produce at least one delay output; and
   selector means for selecting said at least one delay output as at least one of first and second channel signals when the zero-crossing occurs, and for selecting said first and second input signals as said first and second channel signals, respectively, when the zero-crossing does not occur.

2. The modulation apparatus as claimed in claim 1, wherein said delay means comprises a first delay which shifts said first input signal in a positive direction by a preset period and a second delay which shifts said second input signal in a negative direction by the preset period.

3. The modulation apparatus as claimed in claim 1, wherein said delay means comprises a first delay which shifts said first input signal in a negative direction by a preset period and a second delay which shifts said second input signal in a positive direction by the preset period.

4. The modulation apparatus as claimed in claim 1, wherein said first channel signal is provided in a first channel which is an in-phase channel and said second channel signal is provided in a second channel which is a quadrature phase channel.

5. A modulation apparatus, comprising:
   a zero-crossing detector for determining whether zero-crossing occurs between a first input signal and a second input signal;
   a delay for shifting said first input signal by a preset period; and
   a selector for selecting an output of said delay and said second input signal as first and second channel signals when zero-crossing occurs, and selecting said first and second input signals as said first and second channel signals when the zero-crossing does not occur.

6. The modulation apparatus as claimed in claim 5, wherein said delay shifts said first input signal in a positive direction by a preset period.

7. The modulation apparatus as claimed in claim 5, wherein said delay shifts said first input signal in a negative direction by a preset period.

8. The modulation apparatus as claimed in claim 5, wherein said first channel signal is provided in a first channel which is an in-phase channel.

9. The modulation apparatus as claimed in claim 5, wherein said first channel signal is provided in a first channel which is a quadrature phase channel.

10. A spread spectrum apparatus providing code division multiple access communication, comprising:
    a spreader for combining first and second input signals with corresponding pseudo-random noise sequences to generate first and second spread signals;
    a zero-crossing detector for determining whether zero-crossing occurs between said first spread signal and said second spread signal so as to generate a zero-crossing detection signal;
    a first delay for staggering said first spread signal in a first direction;
    a second delay for staggering said second spread signal in a second direction;
    a first selector for selecting one of said first spread signal and a first staggered signal from said first delay in response to the zero-crossing detection signal; and
    a second selector for selecting one of said second spread signal and a second staggered signal from said second delay in response to the zero-crossing detection signal;
    wherein said first selector and said second selector select said first and said second staggered signals when the zero-crossing occurs, and select said first and said second spread signals when the zero-crossing does not occur, thereby maintaining orthogonality of transmission signals.

11. The spread spectrum apparatus as claimed in claim 10, wherein said first delay shifts said first spread signal in a positive direction by a preset chip and said second delay shifts said second spread signal in a negative direction by the preset chip.

12. The spread spectrum apparatus as claimed in claim 11, wherein said first delay shifts said first spread signal by +¼ chip and said second delay shifts said second spread signal by −¼ chip.

13. The spread spectrum apparatus as claimed in claim 10, wherein said first delay shifts said first spread signal in a negative direction by a preset chip and said second delay shifts said second spread signal in a positive direction by the preset chip.

14. The spread spectrum apparatus as claimed in claim 13, wherein said first delay shifts said first spread signal by −¼ chip and said second delay shifts said second spread signal by +¼ chip.

15. The spread spectrum apparatus as claimed in claim 10, wherein said first selector provides a first selected signal on a first channel which is an in-phase channel and said second selector provides a second selected signal on a second channel which is a quadrature phase channel.

16. The spread spectrum apparatus as claimed in claim 10, wherein said first input signal and said second input signal are, respectively, a first orthogonally modulated signal and a second orthogonally modulated signal which are combined with corresponding orthogonal codes.

17. A spread spectrum apparatus for a code division multiple access communication system, comprising:
    a spreader for combining first and second input signals with corresponding pseudo-noise sequences to generate first and second spread signals;
    a zero-crossing detector for generating zero-crossing detection signals in dependence upon whether zero-crossing occurs between said first spread signal and said second spread signal;
    a delay for staggering said second spread signal and producing a staggered signal; and
    a selector for making a selection between said second spread signal and said staggered signal from said delay in response to said zero-crossing detection signals;
    said selector maintaining an orthogonality of transmission signals by outputting said first spread signal and said staggered signal when the zero-crossing occurs, and for outputting said first and second spread signals when the zero-crossing does not occur.

18. The spread spectrum apparatus as claimed in claim 17, wherein said delay shifts said first spread signal in a positive direction by a preset chip.

19. The spread spectrum apparatus as claimed in claim 18, wherein said delay shifts said first spread signal by +½ chip.

20. The spread spectrum apparatus as claimed in claim 17, wherein said delay shifts said first spread signal in a negative direction by a preset chip.

21. The spread spectrum apparatus as claimed in claim 20, wherein said delay shifts said first spread signal by −½ chip.

22. The spread spectrum apparatus as claimed in claim 17, wherein said selector provides a selected signal on a channel which is an in-phase channel.

23. The spread spectrum apparatus as claimed in claim 17, wherein said selector provides a selected signal on a channel which is a quadrature phase channel.

24. The spread spectrum apparatus as claimed in claim 17, wherein said first input signal and said second input signal are, respectively, a first orthogonally modulated signal and a second orthogonally modulated signal which are combined with corresponding orthogonal codes.

25. A spread spectrum method for a code division multiple access communication system, comprising the steps of:
    combining first and second input signals with corresponding pseudo-noise sequences to generate first and second spread signals;
    determining whether zero-crossing occurs between said first spread signal and said second spread signal to generate a zero-crossing detection signal;
    staggering said first spread signal to produce a staggered signal; and
    selecting said staggered signal and said second spread signal when the zero-crossing occurs, and selecting said first and said second spread signals when the zero-crossing does not occur.

26. The spread spectrum method as claimed in claim 25, wherein the staggering step comprises shifting said first spread signal in a positive direction by a preset chip.

27. The spread spectrum method as claimed in claim 26, wherein the staggering step comprises shifting said first spread signal by +½ chip.

28. The spread spectrum method as claimed in claim 25, wherein the staggering step comprises shifting said first spread signal in a negative direction by a preset chip.

29. The spread spectrum method as claimed in claim 28, wherein the staggering step comprises shifting said first spread signal by −½ chip.

30. The spread spectrum method as claimed in claim 25, wherein the selecting step produces a selected signal on a channel which is an in-phase channel.

31. The spread spectrum method as claimed in claim 25, wherein the selecting step produces a signal on a channel which is a quadrature phase channel.

32. The spread spectrum method as claimed in claim 25, wherein said first input signal and said second input signal are, respectively, a first orthogonally modulated signal and a second orthogonally modulated signal which are combined with corresponding orthogonal codes.

33. A spread spectrum method for a code division multiple access communication system, comprising the steps of:

combining first and second input signals with corresponding pseudo-noise sequences to generate first and second spread signals;

determining whether zero-crossing occurs between said first spread signal and said second spread signal so as to generate a zero-crossing detection signal;

staggering said first spread signal in a first direction and said second spread signal in a second direction to produce first and second staggered signals, respectively; and selecting said first and said second staggered signals when the zero-crossing occurs, and selecting said first and said second spread signals when the zero-crossing does not occur.

34. The spread spectrum method as claimed in claim 33, wherein said staggering step comprises shifting said first spread signal in a positive direction by a preset chip and shifting said second spread signal in a negative direction by a preset chip.

35. The spread spectrum method as claimed in claim 34, wherein the staggering step comprises shifting said first spread signal by +¼ chip and said second spread signal by −¼ chip.

36. The spread spectrum method as claimed in claim 33, wherein the staggering step comprises shifting said first spread signal in a negative direction by a preset chip and shifting said second spread signal in a positive direction by a preset chip.

37. The spread spectrum method as claimed in claim 36, wherein the staggering step comprises shifting said first spread signal by −¼ chip and said second spread signal by +¼ chip.

38. The spread spectrum method as claimed in claim 33, wherein the selecting step produces a first selection output on a first channel which is an in-phase channel and produces a second selection output on a second channel which is a quadrature phase channel.

39. The spread spectrum method as claimed in claim 33, wherein said first input signal and said second input signal are, respectively, a first orthogonally modulated signal and a second orthogonally modulated signal which are combined with corresponding orthogonal codes.

40. The modulation apparatus as claimed in claim 1, wherein said delay means comprises a random staggering circuit which delays one of said first and second input signals to produce a single delay output, and said selection means comprises a selector which selects another of said first and second channel inputs and said single delay output as said first and second channel signals when the zero-crossing occurs.

41. The modulation apparatus as claimed in claim 1, wherein said delay means comprises first and second staggering circuits which delay said first and second input signals, respectively, to produce first and second delay outputs, respectively, and said selection means comprises first and second selectors which select said first and second delay outputs, respectively, when the zero-crossing occurs, and which select said first and second input signals, respectively, when the zero-crossing does not occur.

* * * * *